United States Patent
Weitzel et al.

(10) Patent No.: US 6,770,722 B2
(45) Date of Patent: Aug. 3, 2004

(54) PROCESS FOR PREPARING PROTECTIVE-COLLOID-STABILIZED POLYMERS BY CONTINUOUS EMULSION POLYMERIZATION

(75) Inventors: Hans-Peter Weitzel, Reischach (DE); Robert Braunsperger, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 72 days.

(21) Appl. No.: 10/284,989

(22) Filed: Oct. 31, 2002

(65) Prior Publication Data

US 2003/0125451 A1 Jul. 3, 2003

(30) Foreign Application Priority Data

Dec. 19, 2001 (DE) .......................................... 101 62 513

(51) Int. Cl.$^7$ ...................... C08F 210/02; C08F 218/04; C08F 2/30; C08F 4/40
(52) U.S. Cl. ............................. 526/331; 526/65; 526/73
(58) Field of Search .............................. 526/65, 73, 331

(56) References Cited

U.S. PATENT DOCUMENTS

| | | | | |
|---|---|---|---|---|
| 4,035,329 A | * | 7/1977 | Wiest et al. ................. | 524/819 |
| 4,164,489 A | * | 8/1979 | Daniels et al. .............. | 524/733 |
| 6,245,851 B1 | * | 6/2001 | Petrocelli et al. ........... | 524/459 |

FOREIGN PATENT DOCUMENTS

| | | |
|---|---|---|
| DE | 24 56 576 | 8/1976 |
| DE | 100 35 587 A1 | 2/2002 |
| EP | 1 067 142 A2 | 1/2001 |
| EP | 1 067 147 | 1/2001 |
| FR | 2 292 720 | 11/1975 |

OTHER PUBLICATIONS

Derwent Abstract corresponding to DE 2456576 [AN 1976–44051X [24]].
Derwent Abstract corresponding to DE 100 35 587 [AN 2002–218839 [28]].
Fox T.G., Bull. Am. Physics Soc. 1, 3, p. 123 (1956).
Polymer Handbook, 2nd Edition, J. Wiley & Sons, New York (1975).
Derwent Abstract corresponding to FR 229 2720 [AN 1976–44051X].

* cited by examiner

Primary Examiner—Kelechi C. Egwim
(74) Attorney, Agent, or Firm—Brooks Kushman P.C.

(57) ABSTRACT

A process for preparing aqueous dispersions or water-redispersible polymer powders of polyvinyl-alcohol-stabilized polymers based on vinyl ester(s), and ethylene, by continuous emulsion polymerization with no seed latex, and optionally drying the dispersion, by a) polymerizing in at least two pressurized reactors in series at a temperature of 40 to 100° C. and a pressure of 5 to 100 bar to a residual monomer content of less than 3% by weight, and continuing polymerizing in an unpressurized reactor at 20 to 60° C. and less than 1.0 bar;

b) initiating polymerization by a redox system containing oxidizing and reducing components, at least part of the reducing component introduced within the first pressurized reactor, c) metering polyvinyl alcohol into the first pressure reactor such that its proportion is ≦6% by weight, based on the monomers continuously introduced to the reactor, d) introducing 10 to 60% by weight of total vinyl ester into the second pressure reactor, e) maintaining a weight ratio of redox system oxidation component to monomer of from 0.03 to 0.07 in the first reactor, and f) a residence time of 2.5 hours or less in that reactor.

11 Claims, No Drawings

PROCESS FOR PREPARING PROTECTIVE-COLLOID-STABILIZED POLYMERS BY CONTINUOUS EMULSION POLYMERIZATION

BACKGROUND OF THE INVENTION

1. Field of the Invention

The invention relates to a process for preparing protective-colloid-stabilized polymers based on vinyl esters and ethylene, optionally with further comonomers, in the form of their aqueous polymer dispersions or water-redispersible polymer powders, by means of continuous emulsion polymerization without employing a seed latex, and when appropriate, drying the resultant polymer dispersion.

2. Background Art

Protective-colloid-stabilized polymers are used, especially in the form of their aqueous dispersions or water-redispersible polymer powders, in a wide variety of applications, for example as coating compositions or adhesives for application to a wide variety of substrates. The protective colloids are generally polyvinyl alcohols. The use of polyvinyl alcohol as a protective colloid is desirable, since this material contributes to strength properties, for example to the tensile bond strengths of tile adhesives, as opposed to systems stabilized by low-molecular-weight compounds (emulsifiers). The monomers preferably used for preparing redispersible powders have hitherto been vinyl esters and ethylene, since it is difficult to stabilize acrylate copolymers or styrene-acrylate copolymers using polyvinyl alcohol.

The dispersions are traditionally prepared by batch emulsion polymerization. This procedure has high flexibility and is therefore preferred in manufacturing plants producing a wide range of products. In addition, this procedure is much less technically demanding than a continuous process. A disadvantage compared with the continuous process is the much lower cost-effectiveness of batch processes.

A continuous process would therefore be a desirable choice for plants with high output of a narrow range of products. The principle problem with continuous emulsion polymerization is establishing suitable conditions for constant nucleation of new latex particles. The favored plant configuration is a stirred tank cascade, since reactors of this type are already used in batch operations and could therefore be used for the continuous process with only low conversion costs. The product properties and the process parameters usually vary to a greater of lesser extent, however, and in extreme cases can be the cause of unusable product or even damage to the plant.

DE-A 2456576 describes a configuration for continuous polymerization composed of a reactor for the main polymerization and a tubular reactor for postpolymerization. The polymerization is carried out in the presence of a redox initiator system, using a large excess of reducing agent. The monomers are metered in such that their concentration does not exceed a defined limit. A disadvantage of this process is the rapid formation of wall deposits, leading to low plant availability. Among the reasons for formation of wall deposits are the marked variations in product properties.

U.S. Pat. No. 4,164,489 describes a process for the continuous preparation of vinyl acetate-ethylene dispersions using a seed latex which is likewise introduced continuously. In the process of EP-A 1067147, it is recommended that for high-solids-content vinyl acetate-ethylene polymers, polymerization take place in the presence of a seed latex and also a low-molecular-weight polyvinyl alcohol. DE-A 10035587 describes a continuous polymerization process in which the final product can be used as a seed latex, and also a version of the process in which it is possible to work without a seed latex. However, the seed-latex-free process is unsatisfactory with respect to particle size distribution of the resultant products; the particles obtained are excessively coarse.

SUMMARY OF THE INVENTION

It is an object of the present invention to provide a process which continuously prepares vinyl ester-ethylene copolymer dispersions which, even without the use of seed latex, provides products without oscillating product properties and with monomodal particle size distribution with weight-average diameter Dw of from 800 to 1400 nm.

DETAILED DESCRIPTION OF THE PREFERRED EMBODIMENTS

The invention provides a process for preparing polyvinyl-alcohol-stabilized polymers based on vinyl esters and ethylene, optionally with further comonomers, in the form of their aqueous polymer dispersions or water-redispersible polymer powders, by means of free-radical-initiated continuous emulsion polymerization without employing a seed latex, and where appropriate, drying the resultant polymer dispersion, where a) the emulsion polymerization is carried out in at least two pressurized reactors arranged in series at a temperature of from 40 to 100° C. and at a pressure of from 5 to 100 bar, to a residual monomer content of less than 3% by weight, following which the polymerization is continued in at least one unpressurized reactor at a temperature of from 20 to 60° C. and at a pressure of less than 1.0 bar, b) the polymerization is initiated using a redox system comprising an oxidizing component and a reducing component, where at least part of the reducing component is introduced within the first pressurized reactor, c) polyvinyl alcohol is metered into the first pressure reactor such that the proportion of polyvinyl alcohol is always less than or equal to 6% by weight, based on the monomers continuously introduced to the first pressure reactor, d) 10 to 60% by weight of total vinyl ester monomer is reserved for introduction into the second pressure reactor, e) a weight ratio of the oxidation component of the redox initiator combination to monomer of from 0.03 to 0.07 is maintained in the first reactor, and f) a residence time of 2.5 hours or less is established in the first pressure reactor.

Suitable vinyl esters are those of carboxylic acids having from 1 to 12 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 9 to 11 carbon atoms, for example VeoVa9® or VeoVa10® (trade names of Shell). Vinyl acetate is particularly preferred. Generally, the amount of the vinyl esters copolymerized is from 30 to 90% by weight, based on the total weight of the monomers.

The amount of ethylene copolymerized is generally from 1 to 40% by weight, based on the total weight of the monomers.

Suitable further comonomers include those from among the esters of acrylic acid or methacrylic acid, vinyl halides such as vinyl chloride, and olefins such as propylene. Suitable (meth)acrylic esters include esters of unbranched or branched ("optionally branched") alcohols having from 1 to 15 carbon atoms, for example methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate. When such comonomers are employed, the amount copolymerized may be from 1 to 40% by weight, based on the total weight of the monomers.

When appropriate, from 0.05 to 10% by weight, based on the total weight of the monomer mixture, of auxiliary monomers may also be copolymerized. Examples of auxiliary monomers include ethylenically unsaturated mono- and dicarboxylic acids, preferably acrylic acid, methacrylic acid, fumaric acid and maleic acid; ethylenically unsaturated carboxamides and ethylenically unsaturated carbonitriles, preferably acrylamide and acrylonitrile; mono- and diesters of fumaric acid or maleic acid such as their diethyl and diisopropyl esters; maleic anhydride; and ethylenically unsaturated sulfonic acids and their salts, preferably vinylsulfonic acid and 2-acrylamido-2-methylpropanesulfonic acid. Other examples are precrosslinking comonomers, for example ethylenically polyunsaturated comonomers such as divinyl adipate, diallyl maleate, allyl methacrylate, and triallyl cyanurate, and postcrosslinking comonomers, such as acrylamidoglycolic acid (AGA), methyl methacrylamidoglycolate (MAGME), N-methylolacrylamide (NMA), N-methylolmethacrylamide (NMMA), allyl N-methylolcarbamate, and alkyl ethers or esters of N-methylolacrylamide, N-methylolmethacrylamide, or allyl N-methylolcarbamate, such as the isobutoxy ethers. Other suitable comonomers include epoxy-functional comonomers such as glycidyl methacrylate and glycidyl acrylate. Other examples are silicon-functional comonomers, such as acryloxypropyltri(alkoxy)- and methacryloxypropyltri(alkoxy)silanes, vinyltrialkoxysilanes, and vinylmethyldialkoxysilanes, examples of alkoxy groups being methoxy, ethoxy, and ethoxypropylene glycol ether radicals. Mention may also be made of monomers having hydroxyl or CO groups, for example hydroxyalkyl methacrylates and hydroxyalkyl acrylates such as hydroxyethyl, hydroxypropyl, or hydroxybutyl acrylate and the corresponding methacrylates, and also compounds such as diacetone acrylamide and acetylacetoxyethyl(meth)acrylate.

Preference is given to comonomer mixtures of vinyl acetate with from 1 to 40% by weight of ethylene; comonomer mixtures of vinyl acetate with from 1 to 40% by weight of ethylene and with from 1 to 50% by weight of one or more further comonomers selected from the group consisting of vinyl esters having from 1 to 12 carbon atoms in the carboxylic acid residue, e.g. vinyl propionate, vinyl laurate, and vinyl esters of alpha-branched carboxylic acids having from 9 to 11 carbon atoms such as VeoVa9, VeoVa10, and VeoVa11; mixtures of vinyl acetate with from 1 to 40% by weight of ethylene, and preferably from 1 to 60% by weight of acrylic esters of optionally branched alcohols having from 1 to 15 carbon atoms, in particular n-butyl acrylate or 2-ethylhexyl acrylate; mixtures of from 30 to 75% by weight of vinyl acetate, from 1 to 30% by weight of vinyl laurate or vinyl esters of at least one alpha-branched carboxylic acid having from 9 to 11 carbon atoms, from 1 to 30% by weight of acrylic esters of optionally branched alcohols having from 1 to 15 carbon atoms, in particular n-butyl acrylate or 2-ethylhexyl acrylate, and from 1 to 40% by weight of ethylene; or mixtures of vinyl acetate, from 1 to 40% by weight of ethylene, and from 1 to 60% by weight of vinyl chloride; where the mixtures may also further comprise auxiliary monomers in the amounts previously described, and the weight percentages always total 100%.

The selection of monomers and the proportions by weight of the comonomers is such that the resultant glass transition temperature Tg is generally from −50 to +50° C. The glass transition temperature Tg of the polymers may be determined conventionally by differential scanning calorimetry (DSC). The Tg may also be approximated using the Fox equation. According to T. G. Fox, BULL. AM. PHYSICS SOC. 1, 3, page 123 (1956): $1/Tg = x_1/Tg_1 + x_2/Tg_2 + \ldots + x_n/Tg_n$, where $x_n$ is the proportion by weight (% by weight/100) of the monomer n and $Tg_n$ is the glass transition temperature in Kelvin of the homopolymer of the monomer n. Tg values for homopolymers are listed in Polymer Handbook, 2nd Edition, J. Wiley & Sons, New York (1975).

The preparation takes place by emulsion polymerization, the polymerization temperature generally being from 40 to 100° C., preferably from 60 to 90° C. The polymerization is initiated with the redox initiator combinations commonly used for emulsion polymerization. Examples of suitable oxidation initiators are the salts of peroxydisulfuric acid, for example sodium, potassium, and ammonium salts of peroxydisulfuric acid, hydrogen peroxide, tert-butyl peroxide, tert-butyl hydroperoxide, potassium peroxydiphosphate, tert-butyl peroxypivalate, cumene hydroperoxide, isopropylbenzene monohydroperoxide, and azobisisobutyronitrile. Preference is given to the sodium, potassium, and ammonium salts of peroxydisulfuric acid, and hydrogen peroxide. The amount of the initiators generally used is from 0.01 to 2.0% by weight, based on the total weight of the monomers, while maintaining a weight ratio of the oxidation component of the redox initiator combination to monomer of from 0.03 to 0.07 in the first reactor.

Suitable reducing agents are the sulfites and bisulfites of the alkali metals or of ammonium, for example sodium sulfite, derivatives of sulfoxylic acid such as zinc formaldehyde sulfoxylate or alkali metal formaldehyde sulfoxylates, sodium hydroxymethanesulfinate (Bruggolite), and (iso)ascorbic acid. Preference is given to sodium hydroxymethanesulfinate and (iso)ascorbic acid. The amount of reducing agent is preferably from 0.015 to 3% by weight, based on the total weight of the monomers.

The monomer addition is controlled such that a weight ratio of the oxidation component of the redox initiator combination to monomer of from 0.03 to 0.07 is maintained. In the case of redox initiation, the oxidant is usually used in a slight molar excess, for example from 5 to 20%. The particle size distribution Dw is preferably from 800 to 1400 nm, with polydispersity Dw/Dn less than 4.0 (Dw=weight-average particle size, Dn=number-average particle size).

To control the molecular weight, regulators ("chain transfer agents") may be used during the polymerization. If regulators are used, their amount is usually from 0.01 to 5.0% by weight, based on the monomers to be polymerized, and the regulators are usually either metered separately or premixed with reaction components. Examples of regulators include n-dodecyl mercaptan, tert-dodecyl mercaptan, mercaptopropionic acid, methyl mercaptopropionate, isopropanol, and acetaldehyde. It is preferable not to use any regulators.

Suitable protective colloids are partially or completely hydrolyzed polyvinyl alcohols. Preference is given to partially hydrolyzed polyvinyl alcohols with a degree of hydrolysis of from 80 to 95 mol % and with a Höppler viscosity of from 1 to 30 mPas in 4% by weight aqueous solution (Höppler method at 20° C., DIN 53015). Preference is also given to partially hydrolyzed hydrophobically modified polyvinyl alcohols with a degree of hydrolysis of from 80 to 95 mol % and with a Höppler viscosity of from 1 to 30 mPas in 4% by weight aqueous solution. Examples include partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5, or from 9 to 11, carbon atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The proportion of hydrophobic units is preferably from 0.1 to 10% by weight based on the total weight of the partially hydrolyzed polyvinyl alcohol. It is also possible to use mixtures of these polyvinyl alcohols.

Other preferred polyvinyl alcohols are partially hydrolyzed hydrophobicized polyvinyl alcohols which have been obtained by a polymer-analogous reaction, such as acetalization of vinyl alcohol units with $C_1$–$C_4$ aldehydes such as butyraldehyde. The proportion of the hydrophobic units is preferably from 0.1 to 10% by weight, based on the total weight of the partially hydrolyzed polyvinyl acetate. The degree of hydrolysis is from 80 to 95 mol %, preferably from 85 to 94 mol %, and the Höppler viscosity (DIN 53015, Höppler method, 4% by weight aqueous solution) is from 1 to 30 mPas, preferably from 2 to 25 mPas.

Greatest preference is given to polyvinyl alcohols with a degree of hydrolysis of from 85 to 94 mol % and with a Höppler viscosity of from 3 to 15 mPas in 4% by weight aqueous solution (Höppler method at 20° C., DIN 53015). The protective colloids are obtainable by processes known to the skilled worker or are commercially available.

The total amount of polyvinyl alcohol generally added during the polymerization is from 1 to 20% by weight, based on the total weight of the monomers. It is important that the manner of metering the polyvinyl alcohol content into the first pressure reactor is such that its proportion is always less than or equal to 6% by weight, based on the monomers introduced continuously to the first pressure reactor.

In the process of the invention it is preferable to avoid addition of emulsifiers to the polymerization. In exceptional cases it may be advantageous to make concomitant use of small amounts of emulsifiers, for example from 1 to 5% by weight based on the amount of monomer. Suitable emulsifiers include anionic, cationic, and nonionic emulsifiers, for example anionic surfactants such as alkyl sulfates whose chain length is from 8 to 18 carbon atoms, alkyl or alkylaryl ether sulfates having from 8 to 18 carbon atoms in the hydrophobic radical and up to 40 ethylene oxide or propylene oxide units, alkyl- or alkylarylsulfonates having from 8 to 18 carbon atoms, esters and half-esters of sulfosuccinic acid with monohydric alcohols or alkylphenols, and nonionic surfactants such as alkyl polyglycol ethers or alkylaryl polyglycol ethers having from 8 to 40 ethylene oxide units.

The polymerization is carried out in at least two pressurized reactors arranged in series, and then is continued in at least one unpressurized reactor. The pressurized reactors and unpressurized reactors may be conventional steel reactors of appropriate dimensions with stirrer, heating/cooling system, and lines for supplying starting materials and discharging product. The preferred plant configuration is composed of two pressurized reactors arranged in series and one or two subsequent unpressurized reactors. If two or more unpressurized reactors are used, these may be operated either in alternation (alongside one another) or else in succession (in series). Higher-level cascades with more than two pressurized reactors may be used, but are not always desirable since plant complexity then increases.

The manner of conducting the polymerization process is such that in all of the pressurized reactors the total of the mass flows entering equals the total of the mass flows emerging. The unpressurized reactors are preferably operated alongside one another and utilized alternatively. The pressure established in the pressurized reactors arranged in series is such that there is a decreasing pressure gradient from the first of the pressurized reactors arranged in series to the final pressurized reactor. This gradient reliably ensures mass flow within the pressurized reactor cascade. Mass transport from the final pressurized reactor into the downstream unpressurized reactor may take place by way of pressure-regulated valves or by way of a pump, the quantity corresponding to the flow of materials introduced into the upstream pressurized reactors.

Before the start of the polymerization, from 50 to 80% of the volume of the pressurized reactors is filled with a polymer dispersion which corresponds to the final product of the polymerization with respect to copolymer makeup, the nature and amount of the protective colloid, and also the particle size and solids content. This dispersion may be prepared by means of batch polymerization in the pressurized reactors, or the pressurized reactors may be charged with a separately prepared dispersion.

The pressurized reactors are then supplied with an amount of ethylene such that polymerization takes place at a pressure p1, preferably from 30 to 80 bar, in the first pressurized reactor, and a pressure p2, preferably from 10 to 40 bar, in the final pressurized reactor, with the proviso that p1>p2. The ethylene pressure is regulated so that there is a resultant falling pressure gradient from the first of the pressurized reactors arranged in series to the final pressurized reactor. The pressure difference between two pressurized reactors arranged in series is preferably from 2 to 40 bar. This pressure difference between the pressurized reactors acts as the driving force for mass flow during the continuous polymerization process.

Monomer metering is such that from 10 to 60% by weight of the total vinyl ester content is not metered in until the second pressure reactor has been reached. At least 50% by weight of the ethylene forms an initial charge in the first pressure reactor. The metering processes may be carried out separately (spatially and chronologically) or some or all of the components to metered may be metered in pre-emulsified form.

All of the protective colloid may form an initial charge in the first pressurized reactor, or else some of the protective colloid may form an initial charge in the first pressurized reactor with the remainder metered into subsequent pressurized reactors. The polymerization is initiated with a redox system made from an oxidation component and a reduction component, all or part of the reduction component being introduced into the first pressurized reactor, and the oxidation component being metered into all of the pressurized reactors. The metering of the initiator is used to control the conversion of monomers. The manner in which the initiators are metered in is such as to reliably provide continuous polymerization and such that the polymerization in the first pressurized reactor proceeds to a residual monomer content of from 10 to 20% by weight and that in the final pressurized reactor it proceeds to a residual monomer content of less than 3% by weight, based in each case on the total weight of the batch.

The rates of metering of the starting materials are adjusted in such a manner as to give total average residence times in the pressure-reactor cascade of from 1 to 3 hours. The residence time in the first pressure reactor is preferably from 1.5 to 2.5 hours.

After conclusion of the polymerization in the pressurized reactors, known methods are applied in the unpressurized reactor to remove residual monomers, generally via redox-catalyst-initiated postpolymerization. Both components of the initiator are therefore added within the unpressurized reactors, in amounts required for the finishing process. Volatile residual monomers may also be removed by distillation, preferably at reduced pressure, and where optionally, with a passage of inert carrier gases through or over the product, for example air, nitrogen, or steam.

The aqueous dispersions obtainable by the process of the invention have a solids content of from 30 to 75% by weight, preferably from 50 to 60% by weight. To prepare water-redispersible polymer powders, the aqueous dispersions are dried, for example by fluidized-bed drying, freeze drying, or spray drying, optionally after addition of protective colloids as a spraying aid. The dispersions are preferably spray dried. Spray drying may take place in conventional spray drying plants, with atomization by way of single-, twin- or multi-fluid nozzles, by using a rotating disc or any other suitable method. The discharge temperature selected is generally in the range from 45 to 120° C., preferably from 60 to 90° C., depending on the plant, the Tg of the resin, and the desired degree of drying.

The total amount of spraying aid used is generally from 3 to 30% by weight, based on the polymeric constituents of the dispersion. This means that the total amount of protective colloid prior to the drying procedure should be at least from 3 to 30% by weight based on the polymer content, preferably from 5 to 20% by weight based on the polymer content.

Suitable spraying aids include partially hydrolyzed polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinates, soy protein, and gelatin; ligninsulfonates; and synthetic polymers such as poly(meth)acrylic acid, copolymers of (meth)acrylates with carboxyl-functionality comonomer units, poly(meth)acrylamide, polyvinylsulfonic acids, and water-soluble copolymers of these; melamine-formaldehydesulfonates, naphthalene-formaldehydesulfonates, styrene-maleic acid copolymers, and vinyl ether-maleic acid copolymers. It is preferable not to use protective colloids other than polyvinyl alcohols as spraying aids.

A content of up to 1.5% by weight of antifoam based on the weight of the base polymer has frequently proven advantageous during spraying. In order to improve blocking resistance and thus improve storage stability, particularly for powders with a low glass transition temperature, the powder obtained may be provided with an antiblocking agent (anticaking agent), preferably at up to 30% by weight, based on the total weight of polymeric constituents. Examples of antiblocking agents are calcium carbonate, magnesium carbonate, talc, gypsum, silica, kaolins, and silicates, preferably with particle sizes in the range from 10 nm to 10 $\mu$m.

The viscosity of the product to be sprayed is established by means of the solids content generally to provide a viscosity of less than 500 mPas (Brookfield viscosity at 20 rpm and 23° C.), preferably less than 250 mPas. The solids content of the dispersion to be sprayed is generally greater than 35%, preferably greater than 40%.

Other additives may be used during the spraying process in order to improve product performance. Examples of other constituents of dispersion powder compositions, present in preferred embodiments, are pigments, fillers, foam stabilizers, and hydrophobicizing agents.

The aqueous polymer dispersions and the water-redispersible protective-colloid-stabilized polymer powders prepared therefrom may be used in application sectors typical for these materials, for example in construction products, where appropriate in combination with hydraulically setting binders such as cements (Portland, alumina, pozzolanic, slag, magnesia, or phosphate cement), plaster of Paris, or water glass, or for producing construction adhesives, in particular tile adhesives or exterior insulation system adhesives, in plasters or renders, troweling compositions, floor-filling compositions, flowable compositions, sealing slurries, jointing mortars, in paints, as binders for coating compositions or adhesives, or as a composition for the coating or binding of textiles or paper.

The examples below provide further illustration of the invention without limiting the scope of the invention:

COMPARATIVE EXAMPLE 1

4.0 kg of an aqueous dispersion of a vinyl acetate-ethylene copolymer having 83% by weight of vinyl acetate and 17% by weight of ethylene, which had been stabilized with 7% by weight, based on the copolymer, of a polyvinyl alcohol with a degree of hydrolysis of 88 mol % and with a Höppler viscosity of 4 mPas, formed an initial charge in a 5 liter pressurized reactor R1. 500 g of vinyl acetate and 200 g of a 20% by weight aqueous solution of a polyvinyl alcohol with a degree of hydrolysis of 88 mol % and with a Höppler viscosity of 4 mPas also formed an initial charge. This reactor R1 had been connected to a pressurized reactor R2 of identical size, likewise charged with dispersion. Both reactors were supplied with ethylene, the pressure in the first reactor being 70 bar and that in the second reactor being 35 bar. The driving force for mass flow was therefore the pressure difference. The amount of the dispersion removed from the second pressurized reactor by way of a pump was equal to the amount of the streams of material introduced within the two reactors.

Both reactors were heated to 65° C., and then the metering of the initiator, potassium persulfate (3% by weight by weight solution in water) and Bruggolite (1.5% by weight solution in water) was begun (each at 25 ml/h in reactor R1 (0.06% by weight based on monomer), and each at 60 ml/h in reactor R2). At the start of the reaction, detectable from a rise in temperature, the other metering processes into reactor R1 were begun: vinyl acetate at 1000 g/h, 6.6% by weight polyvinyl alcohol solution at 1200 g/h, and ethylene supplemented at a rate of 320 g/h at 70 bar in reactor R1.

The finished dispersion was conveyed by a pump from the pressurized reactor R2 into an unpressurized reactor R3, where its polymerization continued using 20 ml of tert-butyl hydroperoxide (10% by weight solution in water) and 20 ml of Bruggolite (10% by weight solution in water) per 10 kg of dispersion. The polymerization time was 20 hours.

This gave a dispersion with solids content of 50.1%, with a viscosity of 130 mPas (Brookfield 20 at 23° C.), with a pH of 4.0, and with particle diameter Dw of 1170 nm (monomodal). The particle size distribution was stable over the duration of the experiment. No formation of wall deposit was observed.

The screen residue, screening above 250 $\mu$m, was 300 ppm (mg/kg). The K value was 115. Free residual monomer was less than 300 ppm. The dispersion was stable in cement.

EXAMPLE 2

The method of polymerization was the same as in Example 1, except that vinyl acetate was added at 850 g/h reactor R1 and at 150 g/h in reactor 2. In addition, the polyvinyl alcohol solution was also added in R2 (120 g/h).

This gave a dispersion with solids content of 50.6%, with a viscosity of 120 mPas (Brookfield 20 at 23° C.), with a pH of 4.2, and with particle diameter Dw of 1080 nm (monomodal). The particle size distribution was stable over the duration of the experiment. No formation of wall deposit was observed.

The screen residue, screening above 250 µm, was 200 ppm. Free residual monomer was less than 400 ppm. The dispersion was stable in cement.

COMPARATIVE EXAMPLE 3

The method of polymerization was the same as in Example 2, except that 9.0% by weight of polyvinyl alcohol, based on monomer, were used in the first pressurized reactor.

This gave a dispersion with solids content of 50.3%, with a viscosity of 220 mPas (Brookfield 20 at 23° C.), with a pH of 4.1, and with particle diameter Dw of 840 nm. The particle size distribution was stable over the duration of the experiment, but bimodal. No formation of wall deposit was observed.

The screen residue, screening above 250 µm, was 280 ppm. Free residual monomer was less than 500 ppm. The dispersion was stable in cement.

EXAMPLE 4

The method of polymerization was the same as in Example 2, except that 4.5% by weight of polyvinyl alcohol, based on monomer, were used in the first pressurized reactor.

This gave a dispersion with solids content of 50.4%, with a viscosity of 145 mPas (Brookfield 20 at 23° C.), with a pH of 4.3, and with particle diameter Dw of 1150 nm (mononmodal). The particle size distribution was stable over the duration of the experiment. No formation of wall deposit was observed.

The screen residue, screening above 250 µm, was 200 ppm. Free residual monomer was less than 400 ppm. The dispersion was stable in cement.

COMPARATIVE EXAMPLE 5

The method of polymerization was the same as in Example 2, except that the metering rates were reduced to a level which adjusted the average residence time to 3 h in the first pressurized reactor.

This gave a dispersion with solids content of 50.2%, with a viscosity of 110 mPas (Brookfield 20 at 23° C.), with a pH of 4.0, and with particle diameter Dw of 1650 nm (monomodal). The particle size distribution was stable over the duration of the experiment. No formation of wall deposit was observed.

The screen residue, screening above 250 µm, was 220 ppm (mg/kg). The K value is 102. Free residual monomer was less than 400 ppm. The dispersion was stable in cement.

COMPARATIVE EXAMPLE 6

The method of polymerization was the same as in Example 2, except that only 110 g/h of ethylene were metered into the reactor R1. In each case the rate of metering in of the initiator was 5 g/h (0.012% by weight based on monomer).

This gave a dispersion with solids content of 50.1%, with a viscosity of 85 mPas (Brookfield 20 at 23° C.), with a pH of 4.1, and with particle diameter Dw of 1850 nm (monomodal). The particle size distribution was stable over the duration of the experiment. No formation of wall deposit was observed.

The screen residue, screening above 250 µm, was 450 ppm (mg/kg). The K value was 115. Free residual monomer was less than 250 ppm. The dispersion was unstable in cement.

COMPARATIVE EXAMPLE 7

As comparison, a dispersion with identical makeup, but prepared in a batch process, was used. The dispersion was composed of a vinyl acetate-ethylene copolymer having 83% by weight of vinyl acetate and 17% by weight of ethylene, and had been stabilized with 7% by weight, based on the copolymer, of a polyvinyl alcohol with a degree of hydrolysis of 88 mol % and with a Höppler viscosity of 4 mPas.

Powder Preparation:

The dispersions from (Comparative) Examples 1 to 7 were treated with 5% by weight (solids/solids) of polyvinyl alcohol with a degree of hydrolysis of 88 mol % and with a Höppler viscosity of 4 mPas, and diluted with water to a spraying viscosity of 250 mPas. The dispersion was then sprayed by means of a twin-fluid nozzle. Air compressed to 4 bar served as the spraying medium, and the droplets formed were dried using concurrent air heated to 125° C. The resultant dry powder was treated with 10% by weight of commercially available antiblocking agent (a mixture of calcium magnesium carbonate and magnesium hydrosilicate).

Redispersion Performance of Polymer Films

The dispersions of the examples mentioned (prior to spray drying) were used to prepare films of 0.2 mm thickness on glass slides, and these were dried for 15 minutes at 105° C. To check film redispersibility, a pipette was used to apply one water droplet at room temperature to a homogeneous region of each film to be tested. After this region had been exposed to the water droplet for 60 seconds it was rubbed with the end of a finger until the film had been removed from this region of the glass slide, or the film broke up into pieces, or remained intact.

The redispersibility of the polymer films was assessed using the following evaluation scale:

| | |
|---|---|
| Grade 1: | Light rubbing immediately redisperses the film, or it redisperses spontaneously; |
| Grade 2: | Rubbing redisperses the film, but some film fragments may be difficult to disperse; |
| Grade 3: | Vigorous rubbing required to redisperse the film, with formation of film fragments; |
| Grade 4: | Even after a prolonged vigorous rubbing, the film does not redisperse, but fragments. |

Determination of Sedimentation Performance of Powders (Tube Sedimentation):

To determine sedimentation performance, 50 g of each dispersion powder were redispersed in 50 ml of water, then diluted to 0.5% solids content, and the height of settled solids is measured for 100 ml of this redispersion poured into a graduated tube, settlement being measured after 1 hour.

Determination of Blocking Resistance

To determine blocking resistance, the dispersion powder was placed in an iron pipe with a threaded closure, and then subjected to a load from a metal ram. The application of the load was followed by storage for 16 hours at 50° C. in a drying cabinet. After cooling to room temperature, the powder was removed from the tube and resistance to blocking was determined qualitatively by crushing the powder. Resistance to blocking was classified as follows:

```
1 = Very good blocking resistance
2 = Good blocking resistance
3 = Satisfactory blocking resistance
4 = Not resistant to blocking-powder after crushing no longer
    free-flowing.
```

Determination of Cement Stability

A cement mix was prepared with the following formulation:

| | |
|---|---|
| Portland cement | 82.5 g |
| Calcite (CaCO₃ 10–40 nm) | 75 g |
| Quartz sand (200–500 nm) | 142 g |
| Dispersion powder | 14.5 g |
| Water | 85 g |

The workability of the cement mixed was observed over a period of 2 hours and evaluated qualitatively.

Table 1 gives the test results.

TABLE 1

| Example | Redispersibility | Tube Settlement(cm) | Blocking Resistance | PSD $D_w(\mu m)$ | Cement Stability |
|---|---|---|---|---|---|
| Comp. Ex. 1 | 1–2 | 1.5 | 2–3 | 1.17 m | Stable |
| Ex. 2 | 1 | 1.2 | 1 | 1.08 m | Stable |
| Comp. Ex. 3 | 1 | 1.2 | 2 | 0.84 b | Stable |
| Ex. 4 | 1–2 | 1.4 | 1 | 1.15 m | Stable |
| Comp. Ex. 5 | 1–2 | 2.0 | 2 | 1.65 m | Stable |
| Comp. Ex. 6 | 1–2 | 2.5 | 1–2 | 1.85 m | Stable |
| Comp. Ex. 7 | 1–2 | 1.5 | 1 | 0.85 m | Stable | m = monomodal, b = bimodal

Using the procedure of the invention it was possible to achieve products whose dispersion had comparable particle size distribution Dw and whose powders had comparable blocking resistance, and therefore storage stability, to that of vinyl acetate-ethylene powders prepared by a standard batch process. The redispersibility and cement stability are comparable.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing polyvinyl-alcohol-stabilized polymers based on vinyl esters, ethylene and optionally further comonomers, in the form of their aqueous polymer dispersions or water-redispersible polymer powders, by means of free-radical-initiated continuous emulsion polymerization, without employing a seed latex, and in the case of polymer powders, drying the resultant polymer dispersion, comprising a) emulsion polymerizing ethylene, at least one vinyl ester, and optionally further comonomers in at least two pressurized reactors arranged in series at a temperature of from 40 to 100° C. and at a pressure of from 5 to 100 bar, to a residual monomer content of less than 3% by weight, and continuing polymerizing in at least one unpressurized reactor at a temperature of from 20 to 60° C. and at a pressure of less than 1.0 bar;

b) initiating polymerization using a redox system comprising an oxidizing component and a reducing component, where at least part of the reducing component is introduced within the first pressurized reactor;

c) metering-in polyvinyl alcohol in the first pressurized reactor such that the proportion is always less than or equal to 6% by weight, based on the monomers continuously introduced to the first pressurized reactor;

d) reserving 10 to 60% by weight of the total vinyl ester monomer for introduction into the second pressurized reactor;

e) maintaining a ratio by weight of the oxidation component of the redox system to monomer of from 0.03 to 0.07 in the first pressurized reactor; and f) establishing a residence time of 2.5 hours or less in the first pressurized reactor.

2. The process of claim 1, wherein the polymers have a monomodal particle size distribution and have a weight-average diameter Dw of from 800 to 1400 nm.

3. The process of claim 1, wherein all or part of the reducing component is introduced within the first pressurized reactor.

4. The process of claim 2, wherein all or part of the reducing component is introduced within the first pressurized reactor.

5. The process of claim 1, wherein the polymerization is carried out in two pressurized reactors arranged in series and then in one or two unpressurized reactor(s).

6. The process of claim 1, comprising copolymerizing 30 to 90% by weight of one or more vinyl esters of $C_{1-12}$ carboxylic acids, from 1 to 40% by weight of ethylene, the percents by weight based on the total weight of the monomers, optionally with one or more further (meth) acrylic acid ester, vinyl halide, or olefin comonomers.

7. The process of claim 1, wherein the monomers copolymerized are comonomer mixtures of vinyl acetate with from 1 to 40% by weight of ethylene;

comonomer mixtures of vinyl acetate, 1 to 40% by weight of ethylene, and from 1 to 50% by weight of one or more further $C_{1-12}$ carboxylic acid vinyl ester comonomers;

mixtures of vinyl acetate, from 1 to 40% by weight of ethylene, and from 1 to 60% by weight of acrylic esters of optionally branched alcohols having from 1 to 15 carbon atoms;

mixtures of from 30 to 75% by weight of vinyl acetate, from 1 to 40% by weight of ethylene, from 1 to 30% by weight of vinyl laurate or a vinyl ester of a $C_{9-11}$ alpha-branched carboxylic acid, and from 1 to 30% by weight of acrylic esters of optionally branched $C_{1-15}$ alcohols; or mixtures of vinyl acetate, from 1 to 40% by weight of ethylene, and from 1 to 60% by weight of vinyl chloride;

where each of the above mixtures may further comprise auxiliary monomers, the %s by weight totaling 100%.

8. The process of claim 1, wherein the polyvinyl alcohols comprise one or more polyvinyl alcohols selected from the group consisting of partially hydrolyzed polyvinyl alcohols with a degree of hydrolysis of from 80 to 95 mol % and with a Höppler viscosity of from 1 to 30 mPas in 4% by weight aqueous solution.

9. The process of claim 1, wherein the amount of ethylene supplied to the pressurized reactors is such that the polymerization is carried out at a pressure of from 30 to 80 bar in the first pressurized reactor and at a pressure of from 10 to 40 bar in the final pressurized reactor, and the ethylene pressure is such as to give a decreasing pressure gradient from the first to the final reactor of the pressurized reactors arranged in series.

10. The process of claim 1, further comprising metering the initiators such that polymerization in the first pressurized reactor proceeds to a residual monomer content of from 10 to 20% by weight and in the final pressurized reactor polymerization proceeds to a residual monomer content of less than 3% by weight, based in each case on the total weight of the batch.

11. The process of claim 1, wherein an aqueous dispersion produced in the process is dried by spray drying, optionally after addition of other protective colloids as a spraying aid.

* * * * *